No. 637,172. Patented Nov. 14, 1899.
U. P. SMITH.
PUNCTURE CLOSING AIR TUBE FOR PNEUMATIC TIRES.
(Application filed Oct. 9, 1899.)
(No Model.)
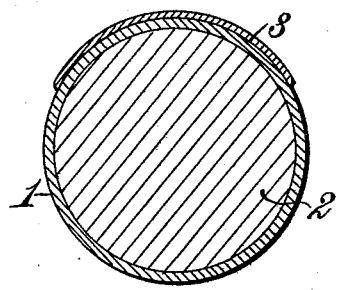
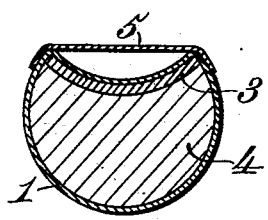
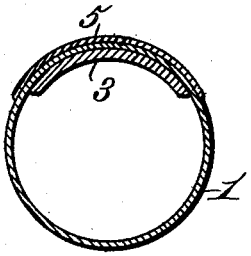
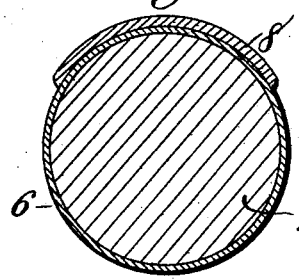
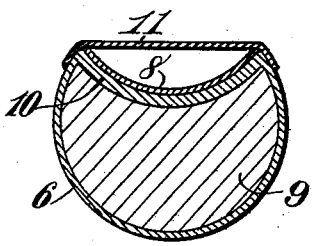
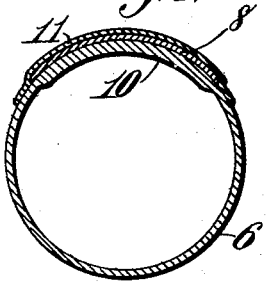
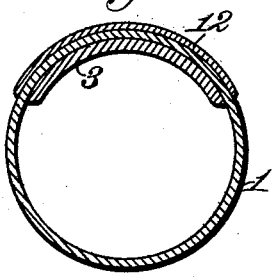
Witnesses.
Robert Everett
H. B. Keeler
Inventor.
Uzziel P. Smith.
By James L. Norris.
Atty.
THE NORRIS PETERS CO., PHOTO-LITHO., WASHINGTON, D. C.

UNITED STATES PATENT OFFICE.

UZZIEL P. SMITH, OF CHICAGO, ILLINOIS.

PUNCTURE-CLOSING AIR-TUBE FOR PNEUMATIC TIRES.

SPECIFICATION forming part of Letters Patent No. 637,172, dated November 14, 1899.

Original application filed April 8, 1899, Serial No. 712,299. Divided and this application filed October 9, 1899. Serial No. 733,090. (No model.)

*To all whom it may concern:*

Be it known that I, UZZIEL P. SMITH, a citizen of the United States, residing at Chicago, in the county of Cook and State of Illinois, have invented new and useful Improvements in Puncture-Closing Air-Tubes for Pneumatic Tires, of which the following is a specification.

My invention relates to puncture-closing air-tubes for pneumatic tires, and has for its object to provide an air-tube in which the rubber of the outer or tread portion thereof shall be held normally under a state of compression or pressure, whereby it will operate to automatically close any puncture or incision made therein.

Before describing my invention in detail I will refer briefly to the accompanying drawings, in which—

Figure 1 is a section through a mandrel having an expanded tube thereon, said tube having a strip of rubber cemented along one of its sides. Fig. 2 is a section through a mandrel with a concave side, showing the tube thereon reversed or turned inside out, the rubber strip thickened and lying in the concave of the mandrel, and a canvas strip secured at its edges to the tube and extending across said concave. Fig. 3 is a section through a completed tube as it appears when inflated. Figs. 4, 5, and 6 illustrate a different method of procedure. Fig. 4 is a section through a mandrel having a tube thereon of the normal size, said tube having an expanded strip of rubber cemented along one of its sides or the tread portion. Fig. 5 is a section through a mandrel having a concave side, showing the tube thereon compressed and lying in said concave and a canvas strip secured at its edges to the tube and extending across said concave. Fig. 6 is a section through a completed tube made by this second method as the tube appears when inflated. Fig. 7 is a section through a completed tube when deflated. Fig. 8 is a section through a tire, illustrating an additional compressing-strip applied thereto.

The puncture-closing air-tube claimed herein can be made according to either one of two methods of procedure, as fully set forth in an application filed by me April 8, 1899, Serial No. 712,299, covering the process of manufacturing the tube, of which the present case is a division.

In order that the present invention may be understood, I will now briefly describe these methods of procedure.

According to the first method I take a piece of rubber tubing 1, such as is ordinarily employed in making the inner tube of a tire and of a length sufficient for that purpose, and immerse the same in any suitable liquid that will cause the rubber to expand or swell. For this purpose I find that a hydrocarbon liquid is preferable, owing to the fact that it evaporates quickly and does not in any manner injure or change the character of the rubber. I therefore usually employ benzin for this swelling-bath, but may use gasolene, naphtha, benzole, carbon bisulfuret, or the like. If the tube is made of what is known as "No. 1" rubber, I leave it in the bath from twenty to thirty minutes, more or less, at the end of which time it will be found to have expanded or swollen to nearly double its normal size in all directions. Thus such a tube as described, if originally six feet in length and an inch and a quarter in diameter, after being subjected to this swelling-bath will be about from nine to ten feet in length, about two inches in diameter, and about twice its normal thickness. The length of time that the tube should remain in the bath depends largely, however, on the quality and thickness of the rubber and the amount of compression required. After the tube has been removed from the bath it is next slipped over a mandrel 2, which is of such diameter as to permit the tube in its expanded state to pass freely thereon—say about two inches. I next take a strip of rubber 3 in its normal condition of the same length as the expanded tube and of the proper width to form the tread of the tube and preferably of about the same thickness as the tube before its expansion and cement it in the ordinary manner along one side of the tube, rolling the same firmly thereon and wrapping rubber or canvas strips around the tube and strip to hold them in firm fixed relation, so as to prevent any movement of the tube in shrinking independent of the strip. When the cement has completely dried, I remove the wrapping from about the tube and remove the tube from the mandrel by rolling or pulling it over itself in a manner to turn the tube inside out, and thereby bring the strip upon the inner side of the reversed tube. By the time the cement has dried the benzin will have entirely evaporated, so that the tube will be free to shrink or contract to its normal size, with the exception that that portion along which the rubber strip is cemented will be retarded in shrinking or contracting or resuming its normal condition by the fact that the strip being firmly cemented to the tube must be compressed as the tube contracts. As the power or force exerted by the tube in contracting is more than sufficient to overcome the resistance of the rubber strip to compression, the effect will be that as the tube was expanded in all directions it will shrink or contract from all directions, and the rubber strip therefore will be compressed or pressed together from all sides, with the result that when the power of the tube on the tread side to shrink or contract has been equalized by the resistance of the strip to compression said strip will be found to have been doubled in thickness and will continue to be held under great pressure exerted from every direction by the contractive force exerted by that portion of the tube to which it is cemented. When removed from the mandrel, the thickened portion of the tube curves inward in the form of an inverted arch and, if unrestrained, will curl upon itself, as indicated in Fig. 7. To complete the tube, I next place it upon a mandrel 4, having a concaved side, the thickened portion of the tube—that is, the compressed or thickened rubber strip 3—lying snugly within the concave, as shown in Fig. 2. I then take a strip of canvas or other inextensible material 5 of the length of the tube and stretch it across said concave, securing its side edges by cement or otherwise to opposite sides of the rubber strip and to the body of the tube, as shown in said Fig. 2. When the cement has dried, the tube is removed from the mandrel 4 and its ends united in any preferred manner as usual. When removed from the mandrel, the tube will curl upon itself in the manner shown in Fig. 7. When partially inflated, the tube will assume the shape in cross-section corresponding to that it had in Fig. 2 when on the mandrel 4—that is, with its thickened or compressed tread portion forming a reversed arch. As the tube is further inflated this arched tread portion will be forced outward; but as the tube cannot yield laterally owing to the connection of the inextensible strip 5 it follows that the strip 3 and the tread portion of the tube as well will be further compressed or thickened as the inflation continues until the parts finally assume the position shown in Fig. 3. The tread portion of the tube will now be held under great compression, resulting from the original compression of the rubber strip effected in the course of manufacture, as previously described, and the further compression effected by the lever power of the arch in the compressed tread portion when acted upon and pressed outward by the pressure of the inflating fluid within, so that if this tread portion be punctured or an incision be made therein the opening will immediately and automatically close. By this method I am able to close punctures of larger dimensions and with greater certainty than can be done by any method of which I am aware, as every portion of the tread of the tube is under a uniform pressure or compressive force exerted from every direction alike. Thus, to illustrate, a puncture in any part of the tread may be likened to the center of a circle and the lines along which pressure is exerted to close said puncture to an infinite number of radii projecting from said center.

In Fig. 8 I have shown a tube which has been submitted to a further or second compression. In this instance after the tube has been reversed, as described, it is again placed on a mandrel. I then take a strip of rubber 12, preferably slightly tougher and less elastic than the strip first used, and after subjecting it to a swelling-bath cement it to the tube in the manner before described and immediately above or over the first-named strip, so that the wall of the tube is confined between these two strips. The result of applying this second strip is that the first strip is still further compressed, and the wall of the tube itself, to which both strips are cemented, is also compressed by the contraction of the second strip. A tube so constructed will operate with certainty to close any puncture made in it and, if desired, may be used in light tires without the canvas strip used in the former cases or made into a complete tire by adding the usual casing.

According to the second mode of procedure I take a piece of tubing 6 of the kind indicated in the first case and of a length to form the completed tube in its normal condition and without treating it in any manner place it upon a mandrel 7, as indicated in Fig. 4. I then take a strip of rubber 8 of such a length that after being subjected to the swelling-bath it shall be the same length as the tube and cement this expanded strip to the tube, rolling the same firmly thereon and wrapping the tube in the manner previously described, with reference to the first mode of procedure. After the cement has dried I remove the wrappings from about the tube and then the tube from the mandrel. In this case the contraction or shrinkage of the strip will serve to compress or thicken the rubber of the tube, and the tube will, when removed from the mandrel, curve inward and roll together in the same manner as previously described. I then place this tube upon a mandrel 9, having a concaved side, the thickened or compressed portion 10 of the tube lying within the concave, and then stretch the canvas strip 11 across the concave and connect its side edges to opposite sides of the tube and strip, as in the other case. The tube as it appears when completed and inflated is shown in section in Fig. 6. The action of the tube in this case in all essential respects is the same as that of the tube made by the first method described. I may mention, however, that in this second method when the strip has contracted and compressed the tread portion of the tube said tread portion will be of a less circumference or length than the opposite side of the tube, so that when the tube is inflated this compressed portion will form the inner periphery of the tube instead of the outer. To overcome this tendency, I either stretch a narrow strip of rubber and cement it to the side of the tube opposite the tread portion or else stretch the tube longitudinally before applying the expanded strip thereto. In either case the result will be that that portion of the tube which is to lie next the rim will contract slightly more than the tread side, and thus cause the tread portion to assume the correct position. I would state that applying the stretched rubber strip to the tube or stretching the tube itself has no effect on the puncture-closing property of the tube, and either of these steps is resorted to solely for the purpose of causing the tread upon inflation to occupy its proper position.

In both the methods herein set forth I have described the tube as having only the tread portion compressed or thickened. It is obvious, however, that I may render the entire body of the tube puncture-closing by applying other strips or another and wider strip thereto in proceeding according to either method. It is also obvious that flat pieces of rubber suitable for constructing such a tube may be so treated and cemented together and afterward made into a tube instead of using a tube already made, as hereinbefore mentioned, and such a method of procedure is contemplated herein.

Tubes constructed according to my invention have a high, even, and uniform compression, which is exerted from every direction alike to a common center or puncture made in the tube. Further, the tread portion of my tube is constantly under a state of compression or pressure even in the deflated condition, and this is increased when the tube is inflated by the action of the arch. It will be observed that the canvas strip is not cemented to the body of the compressed portion of the tube. Hence the rubber is free to exert pressure in all directions independently of the canvas, having only frictional contact with the cloth.

Having thus fully described my invention, what I claim as new is—

1. A puncture-closing tube for pneumatic tires formed of two layers of rubber one of which is expanded relative to the other and cemented thereto while in the expanded state, substantially as described.

2. A puncture-closing tube for pneumatic tires having a tread portion formed of two layers of rubber one of which is expanded relative to the other and cemented thereto while in the expanded state, substantially as described.

3. A puncture-closing tube for pneumatic tires having a tread portion formed of two layers of rubber, one of which is held under compression by the other and having a length of canvas stretched over said tread portion and secured at its edges only to opposite sides of said tread portion, substantially as described.

4. A puncture-closing tube for pneumatic tires having a tread portion formed of two layers of rubber, one of which is expanded relative to the other and cemented thereto while in the expanded state and having a length of canvas stretched over said tread portion and cemented at its edges only to opposite sides of said tread portion, substantially as described.

5. A puncture-closing tube for pneumatic tires having a tread portion composed of two or more layers of rubber, one or more of which layers is expanded and cemented to the other while in the expanded state, whereby one or more of said layers will be held under compression by the contraction of such expanded layer or layers, substantially as described.

In testimony whereof I have hereunto set my hand in presence of two subscribing witnesses.

UZZIEL P. SMITH.

Witnesses:
 LOUIS H. GLUECK,
 MARY E. DE GRAFF.